UNITED STATES PATENT OFFICE.

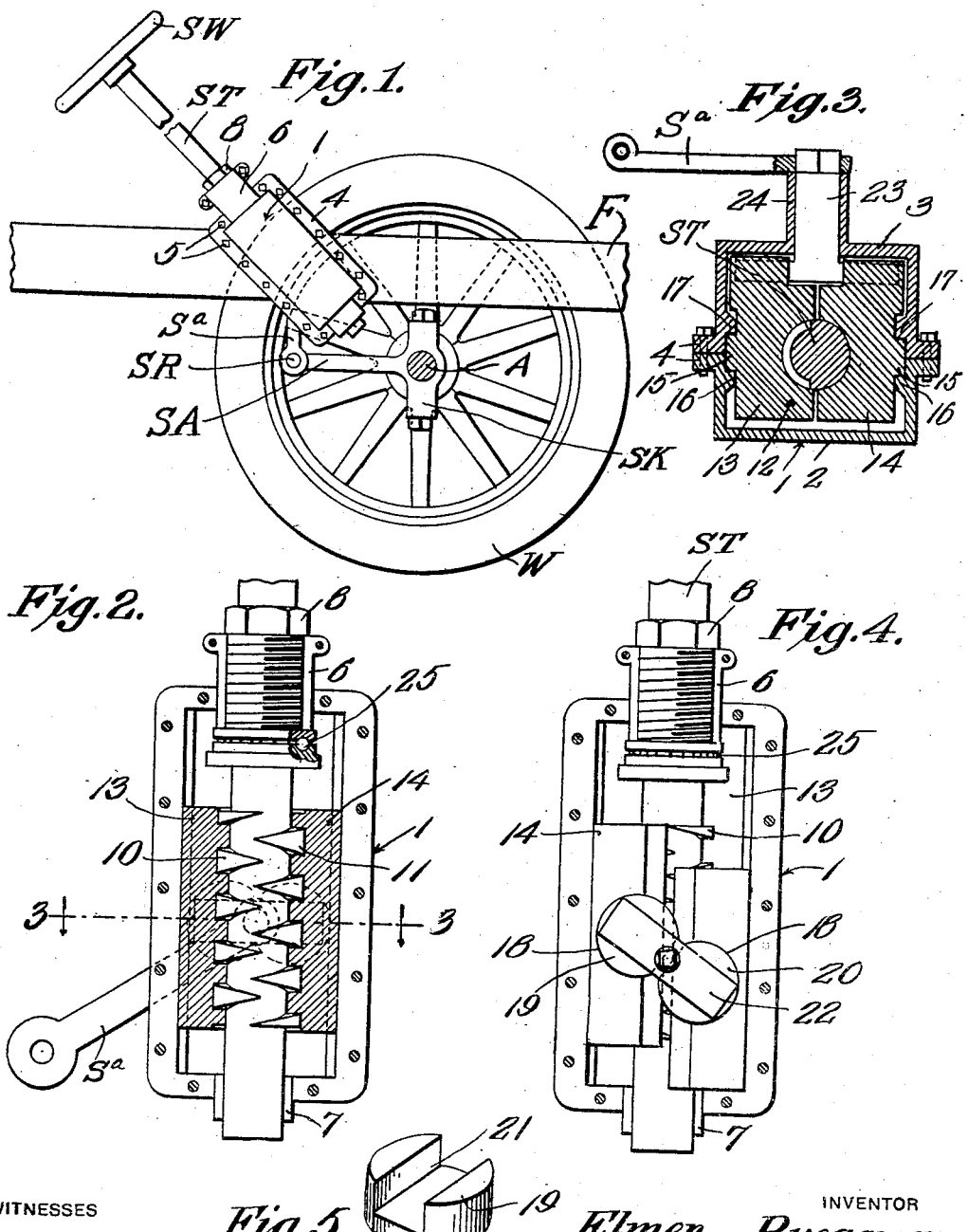

ELMER RUEGAMER, OF LA FAYETTE, INDIANA.

STEERING APPARATUS FOR AUTOMOBILES.

1,251,111. Specification of Letters Patent. Patented Dec. 25, 1917.

Application filed June 15, 1917. Serial No. 174,998.

*To all whom it may concern:*

Be it known that I, ELMER RUEGAMER, a citizen of the United States, residing at La Fayette, in the county of Tippecanoe and State of Indiana, have invented certain new and useful Improvements in Steering Apparatus for Automobiles, of which the following is a specification.

This invention relates to steering apparatus for automobiles.

The object of the invention is to provide a simply constructed and efficient apparatus of this character carried by the ordinary steering tube or column so constructed as to be very sensitive, thus adapting the steering wheels of the machine with which the apparatus is connected to respond instantaneously to a slight turn of the controlling wheel carried by the steering post or column.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section through the front part of the chassis of an automobile with parts broken away to show the location of the steering apparatus, the latter being shown in side elevation, Fig. 2 is a longitudinal section of the device constituting this invention, Fig. 3 is a transverse section taken on the line 3—3 of Fig. 2, Fig. 4 is a side elevation taken from the side opposite that shown in Fig. 1, and Fig. 5 is a detail perspective view of one of the circular plates.

In the embodiment illustrated, a portion of an automobile frame F is shown together with the front axle A and one of the front steering wheels W, the frame being partly broken away. The wheels as W are provided with the usual steering knuckles as SK having steering arms as SA extending rearwardly and connected by a horizontal steering rod SR. A pitman or steering arm Sa is pivotally connected with the rod SR in the usual manner. All of the above described parts are of ordinary construction such as are usually found on various types of automobiles and form no part of this invention, but are designed to be used in connection with the invention and controlled thereby.

The steering mechanism constituting this invention comprises a housing or casing 1 carried by the steering tube or post ST and which latter is equipped with the usual steering wheel SW.

This casing 1 is composed of two sections 2 and 3 which are substantially rectangular in form and are provided on their meeting faces with laterally extending apertured flanges as 4 which are connected by bolts as 5 when the parts are assembled.

This housing 1 is provided in its upper and lower ends with bearings 6 and 7 through which the steering tube ST is designed to extend, said housing being connected to the tube by means of a nut 8 and at its rear is connected to a cross bar (not shown) of the frame F. Carried by the steering column or tube ST within the housing 1 are left and right worms 10 and 11 with which is engaged a split nut 12 so threaded that when the steering post is turned, one half or section of the nut will be actuated by the left hand worm and the other half by the right hand worm to adapt the sections to move longitudinally in opposite directions within the casing 1. The sections 13 and 14 of this split nut 12 are provided on their opposite faces with longitudinally extending guides 15 in the form of ribs which are designed to slide in guides 16 formed on the opposite side walls of the housing 1, said guides being preferably formed by providing ribs 16 and 17 on the sections 2 and 3 of the casing adjacent their meeting edges, said ribs being spaced apart a distance corresponding to the width of the ribs 15 whereby the nut sections are held in operative position and guided in their longitudinal movement.

The nut sections 13 and 14 have circular recesses 18 in one face in transverse alinement with each other when the parts of the nut are in normal inoperative position and truncated on their adjacent faces and which are designed to receive circular plates 19 and 20 which have recesses 21 in their outer faces to receive a cross bar 22, which fits in said recesses 21 and connects said plates so that on the movement of the nut sections in opposite directions caused by the turning of the steering tube ST this bar will be oscillated. A crank arm 23 is fixed to and projects laterally at right angles from the bar 22 midway the ends thereof and extends through a sleeve 24 carried by the casing section 3, said arm 23 constituting a rocking element for the pitman or steering arm Sa and by means of which the steering wheels as W are controlled.

A ball bearing 25 is arranged between the upper end of the steering post or tube ST and the nut 8 to provide for the free turning of said post without binding engagement with the casing.

The post or tube ST may be adjusted to turn with more or less ease by adjusting the nut 8, it being understood that when it is desired to tighten up the post and prevent it from turning freely that the nut will be screwed inwardly and to loosen it, it will be screwed out.

In the operation of this apparatus, the parts being in the position shown in Fig. 1, it will be obvious that a turn imparted by the driver to the steering wheel SW will operate through the worm carried by the steering tube ST to move one of the nut sections up and the other down within the casing 1, thereby causing bar 22 to rock and impart its movement to the crank arm 23 and through the pitman or steering arm Sa turn the steering wheels as W in the direction desired.

From the foregoing description taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A steering apparatus of the class described including a steering rod, a casing through which said rod extends, right and left worms on said rod within said casing, a split nut mounted to slide in said casing with the members thereof engaging said worms, and movable in opposite directions on the turning of said rod, the members of said nut having circular recesses in one face arranged in transverse alinement with each other when the parts of the nut are in normal inoperative position, said recesses being truncated on their adjacent faces, circular plates disposed in said recesses, said plates having recesses in their outer faces, a cross bar fitting in said recesses and adapted to be rocked on the turning of said plates in opposite directions, and a crank arm extending at right angles from said bar midway the ends thereof.

2. Steering apparatus of the class described including a steering tube, a casing through which said tube extends, right and left worms on said tube within said casing, a split nut mounted to slide in said casing with the members thereof engaging said worms and movable in opposite directions on the turning of said tube, a tubular bearing extending from one side wall of said casing and communicating therewith, said nut members having registering recesses in one side wall, a cross bar, plates carried by the ends of said cross bar and mounted in said recesses, a crank shaft projecting laterally from said cross bar midway its ends, and means actuated by said crank shaft for steering the wheels of a vehicle.

In testimony whereof I affix my signature in presence of two witnesses.

ELMER RUEGAMER.

Witnesses:
CHAS. E. ERB,
JOHN D. GOUGAR.